(12) United States Patent
Chang et al.

(10) Patent No.: US 8,072,599 B2
(45) Date of Patent: Dec. 6, 2011

(54) REAL-TIME, HYBRID AMPLITUDE-TIME DIVISION POLARIMETRIC IMAGING CAMERA

(75) Inventors: Tallis Y. Chang, Thousand Oaks, CA (US); Jian Ma, Thousand Oaks, CA (US); Bing Wen, Thousand Oaks, CA (US); Dong-Feng Gu, Thousand Oaks, CA (US); Sung J. Choi, Thousand Oaks, CA (US); Bruce K. Winker, Ventura, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 308 days.

(21) Appl. No.: 12/404,108

(22) Filed: Mar. 13, 2009

(65) Prior Publication Data

US 2009/0237662 A1 Sep. 24, 2009

Related U.S. Application Data

(60) Provisional application No. 61/069,506, filed on Mar. 14, 2008.

(51) Int. Cl.
*G01J 4/00* (2006.01)
(52) U.S. Cl. ........................................................ 356/364
(58) Field of Classification Search .......... 356/364–368; 250/225
See application file for complete search history.

(56) References Cited

U.S. PATENT DOCUMENTS

| | | | | |
|---|---|---|---|---|
| 6,025,917 | A * | 2/2000 | Toyonaga et al. | 356/364 |
| 7,015,456 | B2 * | 3/2006 | Takeuchi et al. | 250/225 |
| 7,016,040 | B2 * | 3/2006 | Chen et al. | 356/364 |
| 7,233,396 | B1 * | 6/2007 | Hall et al. | 356/369 |
| 7,251,029 | B2 * | 7/2007 | Kishikawa et al. | 356/364 |
| 7,286,226 | B2 * | 10/2007 | Takeuchi et al. | 356/364 |

* cited by examiner

*Primary Examiner* — Layla Lauchman
(74) *Attorney, Agent, or Firm* — Koppel, Patrick, Heybl & Philpott (57) ABSTRACT

This disclosure relates to a real-time, hybrid amplitude-time division polarimetric imaging camera used to derive and calculate Stokes parameters of input light.

32 Claims, 4 Drawing Sheets

REAL-TIME, HYBRID AMPLITUDE-TIME DIVISION POLARIMETRIC IMAGING CAMERA

This application claims the benefit of provisional application No. 61/069,506 to Chang et al. filed on Mar. 14, 2008.

BACKGROUND OF THE INVENTION

1. Field of the Invention

This disclosure relates to a real-time, hybrid amplitude-time division polarimetric imaging camera used to derive and calculate Stokes parameters of input light.

2. Description of the Related Art

Traditional imaging systems have long attempted to produce an image capable of revealing useful details to the viewer. In low light-level scenes, for example, imaging can be particularly problematic since traditional cameras do not produce the image-clarity and contrast required to reveal details shrouded in the darker recesses of the image. In applications such as military operations, rescue missions or law enforcement work, for example, object differentiation and clarity is critical.

Some recent approaches to imaging systems have utilized light polarization techniques to process images. A common polarimetric image processing technique involves processing four different linear polarization states, each offset from the other by 45 degrees. Typically, these four polarization states are sufficient to detect the polarization signature caused by light reflection from the surface of an object, which can be useful for differentiating man-made objects from the natural background.

In a well-known polarimetric imaging technique called Time Division Method (TDM) (also known as Time Sequential Method), each one of the four polarization states of an image is captured sequentially in time. This requires rotating the polarizer and capturing the corresponding image four times to obtain the complete set of polarimetric image parameters. One major problem with this approach is motion-induced polarization artifacts that are produced with slight movement in the object/scenery between each measurement when the images shift by even a fraction of a pixel. This problem is especially pronounced in common manually controlled polarization rotators, whose rotation time is in the order of seconds. However, the artifact problem also arises in electrically controlled polarization rotators, such as a liquid crystal polarization rotator. Despite their electrical operation, these polarization rotators lack the speed required to minimize the motion-induced polarization artifacts.

Another commonly used approach for obtaining the four polarization state parameters of a scene is the Aperture Division Method ("ApDM"). In ApDM, an array of micropolarizers arranged in front of an imaging sensor measures and maps the four polarization state parameters to a single polarimetric image pixel. Each polarimetric image pixel comprises a group of four image sensor pixels (typically 2 by 2), and in front of each image sensor pixel is a micropolarizer with its polarization axis aligned with one of the four polarization states. The four imaging sensor pixels detect the four polarization states simultaneously to produce one polarimetric image pixel. The ApDM does not have the motion-induced false polarization artifact associated with the TDM. The use of micropolarizers poses several problems, however. One problem is the loss of resolution due to the use of four sensor elements to form a single image pixel. Another problem is the spatial variance in the four pixels that arises because the light falling on the four sensor pixels is not actually from the same object point. This requires ApDM to employ a post image processing technique to merge the four pixels using software correction, which can add complexity and additional processing power requirements to the system. Another problem with this technique is the crosstalk and limited polarization extinction ratio caused by the light diffracting from a polarizer of one sensor pixel onto another sensor pixel. This problem typically arises because the micropolarizers are made of lithographically written wiregrids and the diffraction from these devices can be significant. Another problem is the requirement of pixel matching between the micropolarizer array and the imaging sensor. For each kind of imaging sensor (or focal plane array), a unique array of polarizers must be developed and fabricated, and the sensor and polarizer array must be aligned and bonded with very high precision. This increases costs over using commercially available imaging sensors.

A third technique for detecting polarimetric images is the Amplitude Division Method ("AmDM"). The AmDM involves using a beam splitter to divide the input light into four images, which are then each polarized and processed separately. Problems with this approach include additional light loss, image aberration management in each arm, and pixel matching of several imaging sensors.

These techniques do not provide the desired polarimetric images having high polarization extinction, absence of motion-induced false polarization signature, small form factor, and high image resolution.

SUMMARY OF THE INVENTION

One embodiment of a real-time polarization imaging system includes a polarization switching system configured to switch between a first and second mode and to provide output light with an unrotated polarization in the first mode and to provide output light with a rotated polarization having a rotational angle in the second mode. A polarization beam splitting system is arranged to receive and separate the output light into two orthogonal s- and p-state polarization components. First and second image sensing systems are each arranged to substantially simultaneously detect the s- and p-state polarization components, respectively. A processing system is arranged to process the s- and p-state polarization components to generate a polarimetric image for display or storage.

Another embodiment includes a polarization switching system configured to switch between two or more modes and provide an output light. A polarization beam splitting system is arranged to separate the output light into s- and p-state polarization components. First and second image sensing systems are each arranged to substantially simultaneously detect the s- and p-state polarization components, respectively. A processing system is arranged to process the s- and p-state polarization components into a polarimetric image.

Another embodiment includes transmitting an input light without rotating a polarization state of the input light in a first mode, rotating the polarization state of the input light in a second mode, separating the output light into an s- and p-component, converting the s- and p-component into first and second electrical signals, and processing the first and second electrical signals to generate a polarimetric image.

DETAILED DESCRIPTION OF THE INVENTION

This disclosure relates to a polarimetric imaging system that measures the four polarization states associated with linear Stokes parameters S1 and S2 by applying real-time, hybrid amplitude-time division to input light using a polarization switching system and a polarization beam splitting system arranged along an optical axis of transmission, as well as a processing system.

As is known in the art, S1 comprises the difference between the light irradiance at polarization states 0 degrees and 90 degrees, and S2 comprises the difference of the light irradiance at polarization states of 45 degrees and 135 or −45 degrees. Stokes parameter S0 can be calculated by adding the irradiance of the two orthogonal polarization states, either from the 0/90 degree set or the 45/−45 set. Together, S0, S1 and S2 are adequate for determining the degree of linear polarization and the angle of linear polarization of the light. Calculating a difference can also be referred to as subtracting.

In the present disclosure, the polarization switching system is configured in a first mode to not rotate the incoming polarization and in a second mode to rotate the incoming polarization by a rotational angle. In one embodiment, the rotational angle is preferably 45°. Also arranged along the optical path is a polarization beam splitting system arranged to receive the incoming light and to separate the light into two optical paths of orthogonal linearly polarized light, namely, s-state and p-state polarization components. First and second image sensing systems are each arranged in the first and second light paths to substantially simultaneously receive the s-state and p-state polarization light. A processing system is arranged to receive and process the first and second output signals to generate a polarimetric image. When the incoming polarization is not rotated, the two image sensors detect $I_0$ and $I_{90}$, corresponding to the optical irradiation at 0 degree and 90 degree polarization, simultaneously. The Stokes Vector S1 is obtained by implementing an $I_0$-$I_{90}$ subtraction operation at the individual pixel level. When the incoming polarization is rotated 45° by the polarization switching system, the two image sensors detect $I_{45}$ and $I_{135}$, corresponding to the optical irradiation at 45 degree and 135 degree polarization, simultaneously, and the Stokes Vector S2 is obtained by implementing an $I_{45}$-$I_{135}$ subtraction operation at the individual pixel level. It is noted that $I_{135}$ and $I_{-45}$ are equivalent. In this manner, and as described further herein, the necessary Stokes parameters are derived.

Figures 1A, 1B:
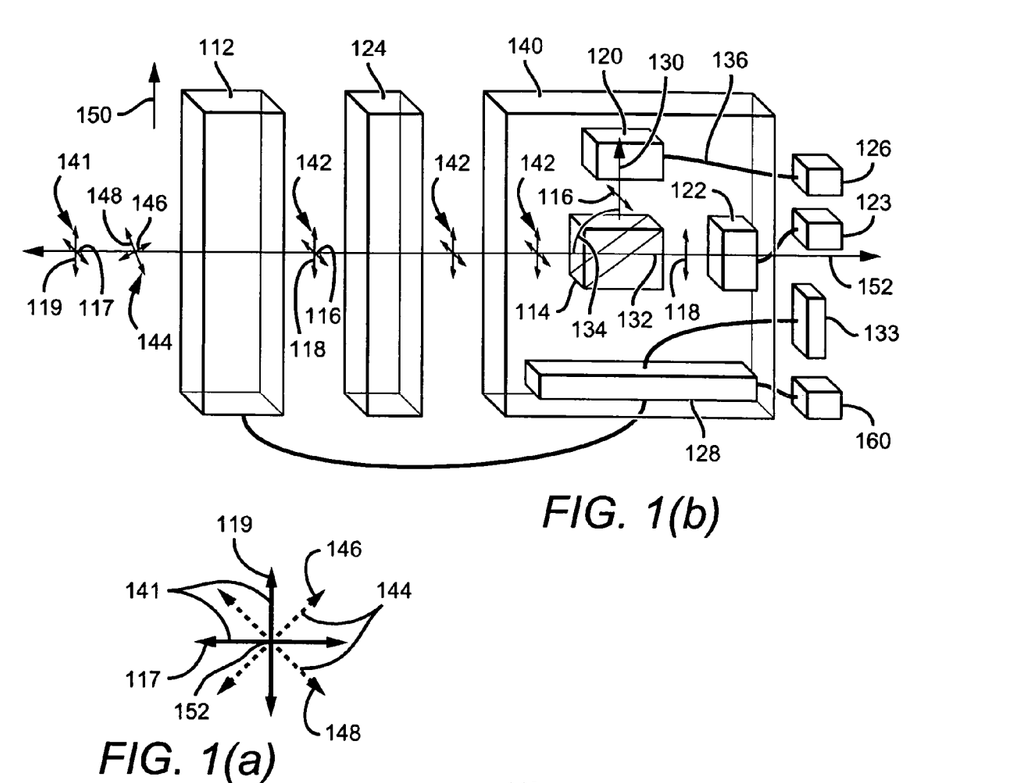
FIG. 1(a) illustrates a perspective cross-sectional view into the optical axis of transmission.
FIG. 1(b) illustrates one embodiment of the present disclosure that includes a polarization switching system, lens system, polarization beam splitting system and image sensing system.

FIG. 1(a) shows a perspective view looking into an axis of transmission 152 and depicting the relationship between two different representations of the polarization of an input light. Any polarization state can be represented by two orthogonal polarizations. Input light polarization representation 141 represents the polarization state of the input light as two orthogonal polarization states of 0° and 90° corresponding to first and second polarization components 117 and 119 for calculating S1. Input light polarization representation 144 represents the polarization state of the same input light as two orthogonal polarization states of 45° and 135° corresponding to first and second polarization components 146 and 148 for calculating S2, prior to their processing by the polarization switching system 112.

FIG. 1(b) shows a first embodiment of the present disclosure. A polarization switching system 112 is arranged to receive input light and in a first mode transmit the light without altering its polarization state and in a second mode rotate the polarization state of the input light by 45 degrees along the axis of transmission 152.

When the switching system 112 is in the first mode, the input light polarization representation 141 is transmitted without rotation. The first and second S1 components 117 and 119 of the input light 141 have polarization states of 0 and 90 degrees, respectively, which correspond to the s-state and p-state polarization components 116 and 118, respectively. The s-state and p-state polarization components 116 and 118 pass through lens system 124 and onto polarization beam splitting system 114. The polarization beam splitting system 114 is arranged to transmit the s-state polarization component 116 along a first light path 130, and to transmit the p-state polarization component 118 along a second light path 132 at substantially the same time, and is preferably cubic, although other implementations are also contemplated. The polarization beam splitting system 114 separates light of orthogonal polarization components at a separation angle 134, which is typically 90 degrees, but can also be any other value. First and second image sensing systems 120 and 122 are arranged along the first and second light paths 130 and 132 to receive the s-state and p-state polarization components 116 and 118, respectively. The image sensing systems 120 and 122 generate video signals 136 and 138, respectively. The video signals 136 and 138 are transmitted to a processing system, such as a PC, through interface 126 and 123. The drive and interface electronics 128 are used to drive the polarization switching system and to trigger the image sensors synchronously. The processing system may be part of the interface electronics 128, in another location in housing 140, or external to housing 140. For this embodiment, the image generated by the p-state polarization component 118 must typically be inverted by the processing system to match the orientation of the image of the s-state polarization component 116. In this manner, two orthogonal polarization components (0 degree and 90 degree) of the ray 142 are detected by the respective imaging sensor 120 and 122 at substantially the same time, thereby reducing or eliminating the time delay generated by sequential measurement of each polarization component. The Stokes parameter S1 can be obtained by subtracting the image obtained by sensor 122 from the image obtained by sensor 120 at the pixel level.

Once the images of 0 degree and 90 degree polarization components are obtained, the polarization switching system 112 is then very rapidly switched either manually or automatically to a second mode. In the second mode, the switching system 112 transmits the input light and rotates its polarization by 45 degrees so that the input light polarization representation 144 is also rotated by 45 degrees. Rotating the polarization of the input light by 45 degrees results in rotating the first polarization component 146 to the s-state, with a polarization state of 0 degrees, and the second polarization component 148 to the p-state, with a polarization state of 90 degrees. Alternatively, the 45 degree rotation can be reversed, so that the first polarization component 146 is rotated to the p-state with a polarization state of 90 degrees and the second polarization component 148 is rotated to the s-state with a polarization state of 0 degrees. The switching typically occurs in approximately in the range of a few milliseconds by using a specialized polarization rotator. In the second mode, the first and second polarization components 146 and 148 are transformed into the s- and p-state polarization components 116 and 118, respectively, by the polarization switching system 112. The s- and p-state polarization components 116 and 118 are processed by the lens system 124, polarization beam splitting system 114 and the respective image sensing systems 120 and 122 in a manner similar to that described for the first mode. A Stokes parameter S2 can then be obtained by subtracting the image obtained by sensor 122 from the image obtained by sensor 120 at a pixel level.

In this manner, the polarization components used to calculate the Stokes parameters S1 or S2 are captured simultaneously while any time delay (1 millisecond, for example) between S1 and S2 due to polarization switching time is not critical because it will not cause a false polarization signature. The polarization components captured in the first and second mode provide enough information to analyze the degree of linear polarization and linear polarization angle of an image and may provide additional details and enhance its contrast.

Figure 2:
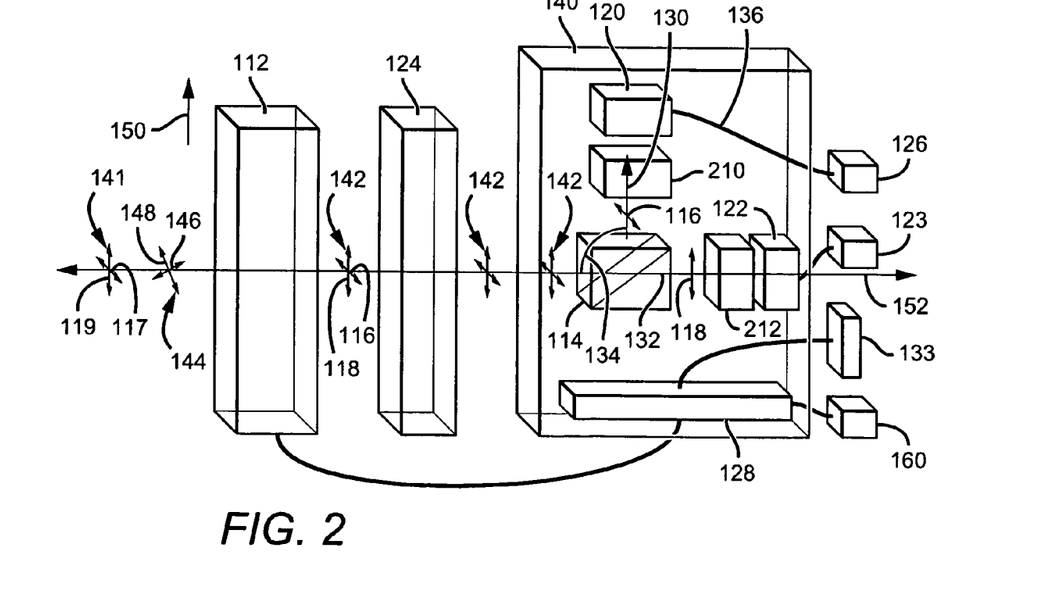
FIG. 2 illustrates another embodiment of the present disclosure similar to FIG. 1(b), but that includes cleanup polarizers.

FIG. 2 shows a second embodiment of the present disclosure. This embodiment is structurally and operationally similar to the first embodiment, except that one or more cleanup polarizers are arranged between the polarization beam splitting system 114 and one or more of the image sensing systems 120 and 122. In one embodiment, first and second cleanup polarizers 210 and 212 are arranged along first and second light paths 130 and 132 between the polarization beam splitting system 114 and first and second image sensing systems 120 and 122, respectively. Each cleanup polarizer blocks light having a polarization state orthogonal to the one transmitted along its respective light path by the polarization beam splitter 114. For example, first cleanup polarizer 210 arranged along first light path 130 blocks light of the p-state polarization component 118, but transmits light of the s-state polarization component 116. Second cleanup polarizer 212 arranged along the second light path 132 blocks light of the s-state polarization component 116, but transmits light of the p-state polarization component 118. The cleanup polarizers are preferably arranged near their respective image sensing system to provide for higher aberration tolerance, although they can be arranged near the polarization beam splitter as well in other embodiments. For example, the cleanup polarizers may be disposed 0.7 mm from their respective image sensing system. In this manner, the cleanup polarizers block light of the undesirable polarization state for the given light path that may have leaked from the polarization beam splitting system 114. This can help improve the clarity of the image generated by improving on the polarization extinction ratio. Because light reflected from the polarization beam splitter can have a larger leakage of the undesired orthogonal polarization component than the transmitted light, it is possible to add only one clean-up polarizer in the optical path 130. However, a piece of glass that has a thickness and index of refraction similar with the clean-up polarizer may be added in the optical path 132 to make the two optical paths (130 and 132) symmetrical.

Figure 3:
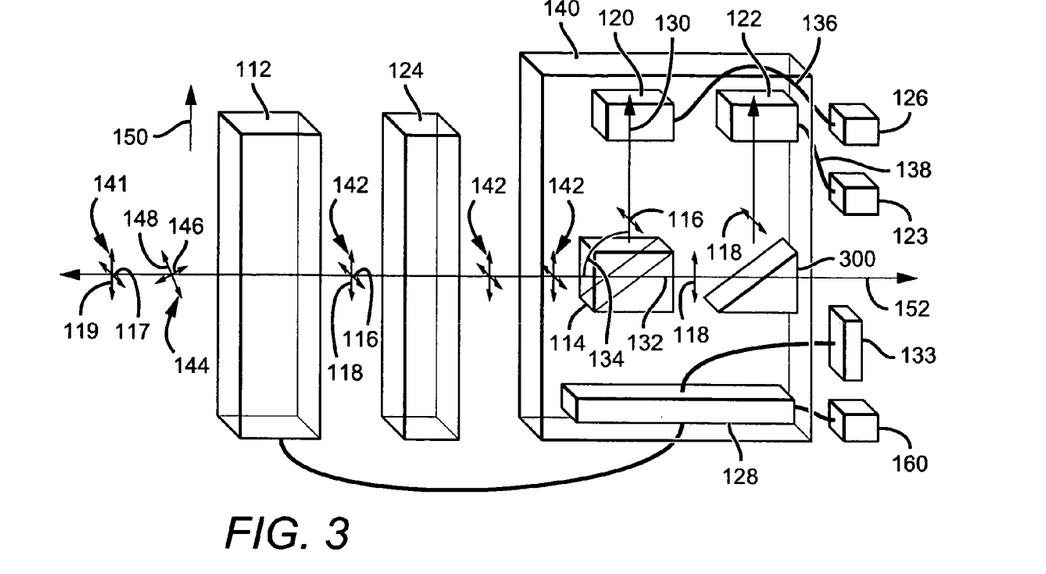
FIG. 3. illustrates another embodiment of the present disclosure similar to FIG. 1(b), but that also includes an image inverter along one of the light paths.

FIG. 3 shows a third embodiment of the present disclosure. This embodiment is structurally and operationally similar to the first embodiment, except that an image inverter (e.g., a mirror) is arranged along one of the light paths between the polarization beam splitting system and the image sensing system. The light traveling along the optical path taken by the first polarization light experiences a reflection, while the light traveling along the optical path taken by the second polarization does not. As a result, the image formed on the sensor of the first optical path is inverted with respect to the image formed on the second sensor. If the image sensor pixel is not symmetric, such an inversion may introduce a false polarization signature. An image inverting system (e.g., a mirror) can be arranged along the second light path to invert the image formed on the second sensor such that the images formed on both sensors have the same orientation. The image inverting system inverts the image before its detection by the image sensing system. For example, FIG. 3 shows the image inverter 300 arranged along the second light path 132 between the polarization beam splitting system 114 and the second image sensing system 122, which is oriented and positioned to receive the image. Since the image is inverted prior to detection by the image sensing system, the orientation of the image formed on the image sensor 122 is identical to the image formed on the image sensor 120, and the processing subsystem (not shown) does not have to invert the image prior to combining it with the image from the other sensor.

Figure 4:
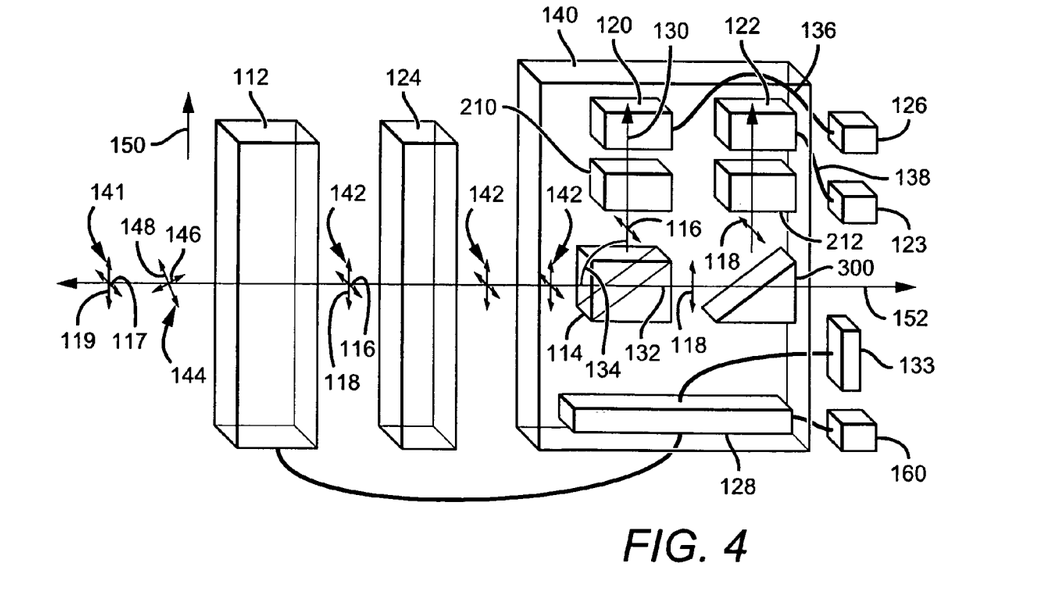
FIG. 4 illustrates another embodiment of the present disclosure similar to FIG. 3, but that also includes cleanup polarizers.

FIG. 4 shows a fourth embodiment of the present disclosure. This embodiment shows one example of combining the cleanup polarizers of the second embodiment with the image inverter 300 of the third embodiment. As discussed in the second embodiment, the cleanup polarizers 210 and 212 are arranged along the first and second light paths 130 and 132 between the polarization beam splitting system and the first and second sensors, respectively. The image inverter 300 can be arranged between the polarization beam splitting system 114 and one of the cleanup polarizers. For example, the image inverter 300 is arranged along the second light path 132 between the polarization beam splitting system 114 and the cleanup polarizer 212 in FIG. 4. Alternatively, the image inverter 300 may be arranged between the cleanup polarizer 212 and the second image sensing system 122.

Figure 5:
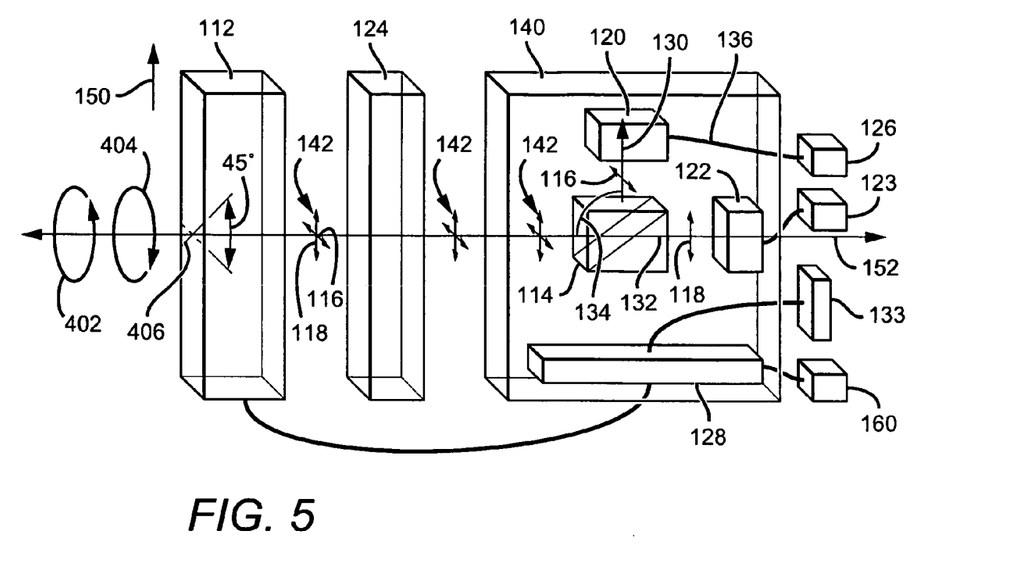
FIG. 5 illustrates another embodiment of the present disclosure similar to FIG. 1(b), but that operates with circularly polarized light.

FIG. 5 shows another embodiment of the present disclosure that uses a similar arrangement described previously with respect to FIGS. 1-4, but which calculates the third Stokes parameter S3 that characterizes the property of the light using circular polarization. S3 is the difference of optical irradiance between the right-circular polarization component and the left-circular polarization component, and it is described as $S3=I_{RC}-I_{LC}$, where, $I_{RC}$ is the irradiance of the right-circular polarization component and $I_{LC}$ is the irradiance of the left-circular polarization component.

Light of any polarization state can be decomposed into two orthogonal linear polarization components as depicted in FIGS. 1-4. Likewise, light of any polarization state can be decomposed into two orthogonal polarization components of right-circular polarization 402 and left-circular polarization 404, as showed in FIG. 5. To implement S3 in addition to S1 and S2 with the polarimetric imaging system, the switching system 112 includes an additional third mode, which converts the circular polarization components into linear polarization components. In this third mode, the polarization switching system behaves like a quarter-wave phase retarder. It is known that a quarter-wave phase retarder converts a right-circular polarization light into a linear polarization light with its polarization state 45° to the axis of the quarter-wave phase retarder, and converts a left-circular polarization light into a linear polarization light with its polarization state −45° to the axis of the quarter-wave phase retarder. By aligning the quarter-wave phase retarder's axis 406 at 45° with respect to the polarization beam splitter 114, the two orthogonal polarization components associated with the right- and left-circular polarization components are separated into two optical paths, 130 and 132, and are detected by the image sensors 120 and 122 respectively. All implementations described previously through FIGS. 1-4 are applicable to this embodiment, which can include any of the configurations depicted in those figures.

Figure 6:
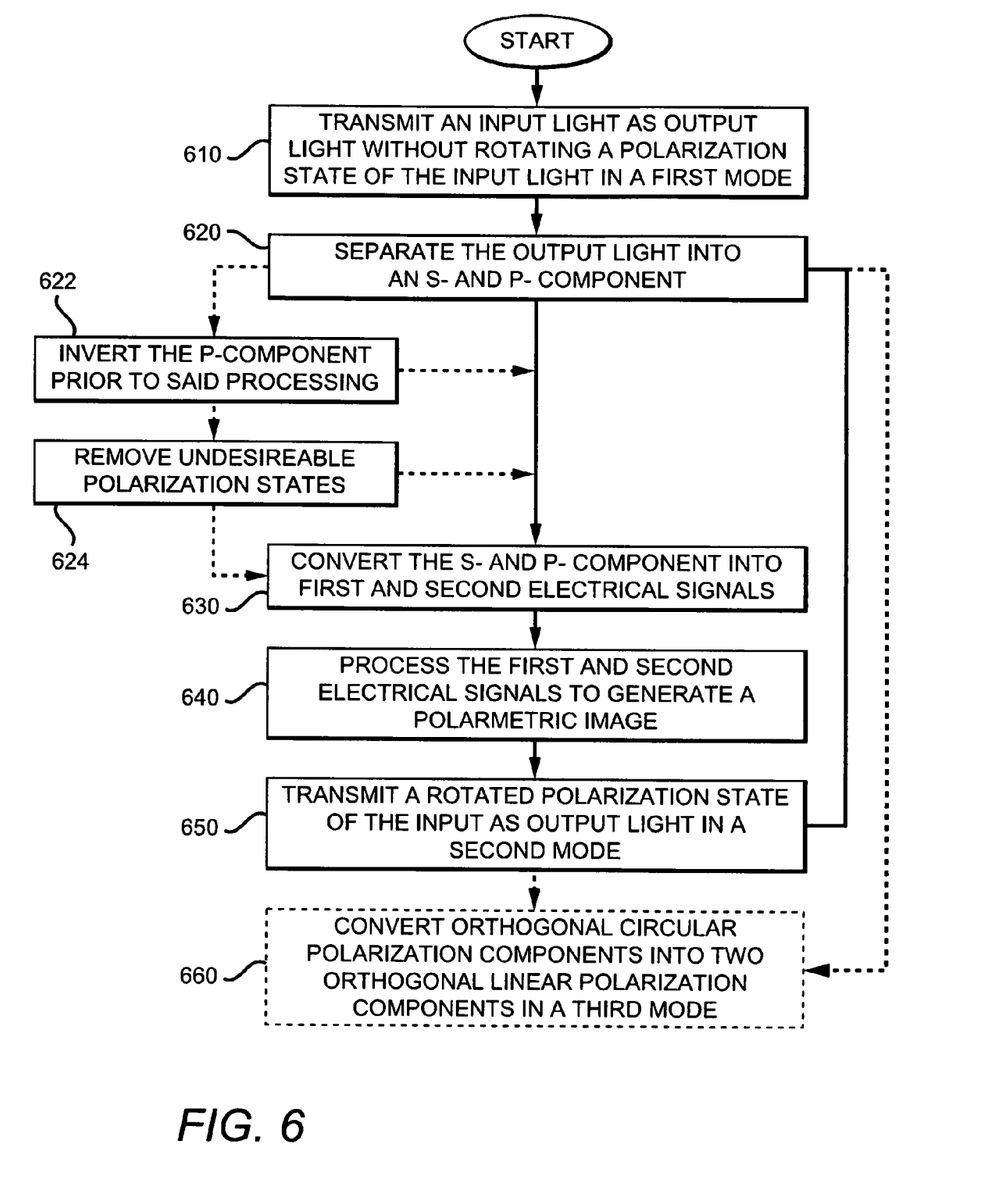
FIG. 6 is a flow diagram illustrating one embodiment of a method for generating a polarimetric image.

FIG. 6 shows an embodiment of a method for the present disclosure. In this embodiment, an input light is transmitted as output light without rotating a polarization state of the input light in a first mode (step 610). The output light is separated into s- and p-components (step 620). Optionally, the p-component may be inverted prior to processing (step 622), and undesirable polarization states may optionally be removed (step 624). The s- and p-components are converted into electrical signals (step 630), which are then processed to generate a polarimetric image (step 640). In a second mode, the polarization state of the input light is rotated to produce output light (step 620). Switching between first and second modes may be done manually or automatically. In an optional third mode, orthogonal circular polarization components are converted into two orthogonal linear polarization components (step 625). The steps are not limited to any particular order.

In another embodiment of the present disclosure, the lens system 124 comprises a camera lens (e.g., a Nikon f28 mm/F2.8 camera lens). The polarization beam splitting system 114 comprises a 0.5" cube polarizing beam splitter, and the clean up polarizers 210 and 212 are 3.2 mm thick and arranged 0.7 mm from the first and second image sensing systems 120 and 122, respectively, which comprise CCDs having a 9.9 um×9.9 um pixel size.

For all embodiments, the first and second image sensing systems 120 and 122 can detect visible or infrared light, and can be CCDs, CMOS, InGaAs, InSb, $Hg_xCd_{1-x}Te$ or any other type of sensor capable of working within the band to be detected. The first and second image sensing systems 120 and 122 can be the same type of device, or can include a mix of devices.

For all embodiments, the polarization switching system 112 can be switched between first and second modes manually or automatically using a triggering mechanism (not shown), which can be electrical, optical or mechanical. Preferably, the triggering mechanism coordinates with the rest of the system to cause the switching to occur prior to capturing the image.

For all embodiments, the optical elements used can vary in performance and design. For example, the polarization beam splitting system 114 is preferably cubic to minimize aberrations. However, parallel plate polarization beam splitters can also be used, provided they produce a desirable image. Likewise, the focal length of the camera lens can vary.

For all embodiments, the image sensing systems can utilize a variety of sensing technologies such as charged coupling device ("CCD") sensors or complementary metal-oxide semiconducting ("CMOS") sensors. Typically, the image sensing systems should have a large pixel size, preferably, fast frame rates, small size, and a fast image interface for transferring data. One example of such image sensing systems includes, but is not limited to, those having a pixel size of approximately 10 um, frame rates greater than or equal to 20 frames per second and a size that less than one inch in dimension. One example of a fast data transfer image interface is one or more IEEE 1394 connections, which as discussed previously, is typically used to transfer image data. The preferred image sensing system type is a CCD sensor, with one example of a suitable CCD being a Sony ICX414 or a Kodak KAI-0330. Other CCD sensor brands may also be used, however.

A separate alignment station can be used to align the first and second image sensing systems 120 and 122 to preferably match the images on both sensor with a subpixel level accuracy during assembly of the polarimetric image system disclosed. The alignment station typically comprises one image sensor passively mounted and held stationary and the other image sensor aligned using a 6 degree of freedom alignment tool with a 0.1 um resolution (e.g. a hexapod made by Physik Instrument) and then fixated with epoxy. Preferably, the first and second image sensing systems are also oriented with respect to each other to compensate for any tilt. Any pixel shifting caused by tilted image sensing systems is compensated for since both CCDs experience the same pixel shift.

For all embodiments, the interface electronics 128 can also perform other functions, including but not limited to driving the other components of the system and processing the image information for display. Although shown as a single entity, the interface electronics 128 can alternatively comprise a set of smaller interface electronics that may or may not be coupled together, depending on their function. Additionally, all embodiments herein can include an I/O interface 133, which is typically either USB, IEEE1394 ("Firewire"), Cameralink or any other type of controlling interface and a power connection 160 for supplying electricity to the system.

For all embodiments, the signals can be of any type, including, but not limited, to electrical and optical signals. The image sensing systems 120 and 122 can be electrically connected to a processing system through the interface 123 and 126, and are typically driven by the interface electronics 128 through a connection (not shown). The processing system processes the s-state and p-state polarization components of the images for display and analysis.

For all embodiments, the drive and interface electronics 128 are used to switch the polarization switching system 112 and to trigger the image sensors 120 and 122 synchronously. It is also possible to include the image processing system within the drive and interface electronics 128 such that the image data from the image sensing systems 120 and 122 can be directly processed internally. Additionally, the polarization switching system 112 may utilize its own drive electronics in an alternative configuration.

For all embodiments, the position of the polarization switching system 112 and lens system 124 may be reversed.

For all embodiments utilizing an image inverter 300, the image inverter 300 is preferably arranged such that both s- and p-state polarization components 116 and 118 travel the same optical path length between the lens system 124 and the first and second image sensing systems 120 and 122, respectively.

The polarization switching system 112 typically comprises one or more polarization rotators that can be adjusted to rotate the orientation of the linearly polarized output light by an orientation angle 226. The specific orientation of the polarization states shown in FIG. 1(*b*) and the other figures throughout this disclosure are for illustrative purposes only, and can vary.

While various implementations and embodiments of the present disclosure have been described, it will be apparent to those of ordinary skill in the art that many more are possible.

What is claimed is:

1. A real-time polarization imaging system, comprising:
   a polarization switching system configured to switch between a first and second mode and to provide output light with an unrotated polarization in said first mode and to provide output light with a rotated polarization having a rotational angle in said second mode;
   a polarization beam splitting system arranged to receive and separate said output light into s- and p-state polarization components and to transmit said s- and p-state polarization components along respective light paths which are orthogonal to each other;
   first and second image sensing systems, each arranged to substantially simultaneously detect said s- and p-state polarization components, respectively; and
   a processing system arranged to process said s- and p-state polarization components to generate a polarimetric image for display.

2. The system of claim 1, wherein said rotational angle is 45 degrees.

3. The system of claim 1, wherein in said first mode, said s- and p-state polarization components comprise irradiance of polarization states $I_0$ and $I_{90}$ of said input light, respectively, and in said second mode, said s- and p-state polarization components comprise irradiance of polarization states $I_{45}$ and $I_{135}$ of said input light, respectively.

4. The system of claim 1, wherein a switching time between said first and said second mode is several milliseconds or less.

5. The system of claim 1, wherein said polarization switching system comprises a liquid crystal waveplate.

6. The system of claim 5, wherein said liquid crystal waveplate comprises one or more wideband liquid crystal phase retarders.

7. The system of claim 1, wherein said processing system is configured to generate an $S_1$ image in said first mode and generate an $S_2$ image in said second mode by subtracting said s- and p-state polarization components.

8. The system of claim 7, wherein said s- and p-state polarization components comprise digital pixel images.

9. The system of claim 1, wherein said switching is controlled by an electric signal and is synchronized with said first and second image sensing systems.

10. The system of claim 1, further comprising first and second cleanup polarizers arranged to remove any undesirable leakage of polarization components from said polarization beam splitting system.

11. The system of claim 1, further comprising a lens system to image said output light onto said first and second image sensing systems.

12. A real-time polarization imaging system, comprising:
    a polarization switching system configured to switch between a first and second mode and to provide output light with an unrotated polarization in said first mode and to provide output light with a rotated polarization having a rotational angle in said second mode;
    a polarization beam splitting system arranged to receive and separate said output light into two orthogonal s- and p-state polarization components;
    first and second image sensing systems, each arranged to substantially simultaneously detect said s- and p-state polarization components, respectively;
    a processing system arranged to process said s- and p-state polarization components to generate a polarimetric image for display; and
    an image inverter arranged to invert one of said s- and p-state polarization components.

13. The system of claim 12, wherein said image inverter comprises a mirror.

14. A real-time polarization imaging system, comprising:
    a polarization switching system configured to switch between a first and second mode and to provide output light with an unrotated polarization in said first mode and to provide output light with a rotated polarization having a rotational angle in said second mode;
    a polarization beam splitting system arranged to receive and separate said output light into two orthogonal s- and p-state polarization components;
    first and second image sensing systems, each arranged to substantially simultaneously detect said s- and p-state polarization components, respectively;
    a processing system arranged to process said s- and p-state polarization components to generate a polarimetric image for display;
    first and second cleanup polarizers arranged to remove any undesirable leakage of polarization components from said polarization beam splitting system; and
    an image inverter arranged to invert one of said s- and p-state polarization components.

15. The system of claim 14, wherein said image inverter comprises a mirror.

16. A real-time polarization imaging system, comprising:
    a polarization switching system configured to switch between two or more modes and provide an output light;
    a polarization beam splitting system arranged to separate said output light into s- and p-state polarization components and to transmit said s- and p-state polarization components along respective light paths which are orthogonal to each other;
    first and second image sensing systems, each arranged to substantially simultaneously detect said s- and p-state polarization components, respectively; and
    a processing system arranged to process said s- and p-state polarization components into a polarimetric image.

17. The system of claim 16, wherein said modes comprise a first mode having a rotational angle of 0 degrees and a second mode having a rotational angle of 45 degrees with respect to an optical axis of transmission.

18. A real-time polarization imaging system, comprising:
    a polarization switching system configured to switch between two or more modes and provide an output light;
    a polarization beam splitting system arranged to separate said output light into s- and p-state polarization components;
    first and second image sensing systems, each arranged to substantially simultaneously detect said s- and p-state polarization components, respectively; and
    a processing system arranged to process said s- and p-state polarization components into a polarimetric image;
    wherein said modes comprise a first mode having a rotational angle of 0 degrees and a second mode having a rotational angle of 45 degrees with respect to an optical axis of transmission, and
    wherein said modes further comprise a third mode wherein said polarization switching system is configured to convert two orthogonal circular polarization components into two orthogonal linear polarization components.

19. The system of claim 16 wherein said polarization switching system comprises one or more broadband liquid crystal phase retarders.

20. The system of claim 16, wherein said polarization switching system has a switching time of several milliseconds or less.

21. The system of claim 16, wherein said polarization switching system switches synchronously with said first and second image sensing systems.

22. A real-time polarization imaging system, comprising:
- a polarization switching system configured to switch between two or more modes and provide an output light;
- a polarization beam splitting system arranged to separate said output light into s- and p-state polarization components;
- first and second image sensing systems, each arranged to substantially simultaneously detect said s- and p-state polarization components, respectively;
- a processing system arranged to process said s- and p-state polarization components into a polarimetric image; and
- an image inverter arranged to invert an image in said p-state polarization component.

23. The system of claim 22, wherein said image inverter comprises a mirror.

24. The system of claim 16, further comprising cleanup polarizers arranged to remove undesirable polarization components.

25. The system of claim 22, further comprising cleanup polarizers arranged to remove undesirable polarization components.

26. The system of claim 16, wherein said image sensors comprise one or more of CCDs, CMOS, InGaAs, InSb, or $Hg_xCd_{1-x}Te$.

27. A method for real-time, polarization imaging, comprising:
- transmitting an input light as output light without rotating a polarization state of said input light in a first mode;
- transmitting a rotated polarization state of said input light as output light in a second mode;
- separating said output light into an s- and p-state polarization components;
- transmitting said s- and p-state polarization components along respective light paths which are orthogonal to each other;
- converting said s- and p-state polarization components into first and second electrical signals; and
- processing said first and second electrical signals to generate a polarimetric image.

28. The system of claim 27, wherein said processing comprises subtracting said first and second signals.

29. The system of claim 27, wherein said converting comprises digitizing.

30. The system of claim 27, further comprising inverting said p-component prior to said processing.

31. The system of claim 27, further comprising removing undesirable polarization states.

32. A method for real-time, polarization imaging, comprising:
- transmitting an input light as output light without rotating a polarization state of said input light in a first mode;
- transmitting a rotated polarization state of said input light as output light in a second mode;
- separating said output light into an s- and p-component;
- converting said s- and p-component into first and second electrical signals;
- processing said first and second electrical signals to generate a polarimetric image; and
- converting orthogonal circular polarization components into two orthogonal linear polarization components in a third mode.

* * * * *